United States Patent Office 3,488,336
Patented Jan. 6, 1970

3,488,336
MANUFACTURE OF THERMOPLASTIC POLYACRYLONITRILE
Russell K. Griffith, Chagrin Falls, Ohio, assignor to The Standard Oil Company, Cleveland, Ohio, a corporation of Ohio
No Drawing. Filed May 29, 1967, Ser. No. 642,144
Int. Cl. C08f 1/60, 3/76
U.S. Cl. 260—88.7                    5 Claims

ABSTRACT OF THE DISCLOSURE

Low molecular weight, thermoplastic polyacrylonitrile resins are prepared by polymerization of acrylonitrile in aqueous solution wherein the concentration of the acrylonitrite monomer ranges from about 0.01 to 0.10 mole per liter of solution and at a pH in excess of 4 and at a temperature in the range of 0° C. to 70° C.

---

This invention relates to a process for preparing low molecular weight, thermoplastic polyacrylonitrile which melts at elevated temperatures, which involves the polymerization of acrylonitrile in aqueous solution at a pH above 4.

Polyacrylonitrile is a very useful material which is commonly employed in the manufacture of synthetic fibers. Polyacrylonitrile is not considered to be a thermoplastic material because its softening point is near its decomposition temperature. Because of its insolubility and failure to melt or fuse with heat as usual thermoplastic polymers do, it was believed at one time that polyacrylonitrile was crosslinked. The subsequent discovery of several types of solvents which will give smooth, viscous solutions of the polymer at moderate temperatures dispelled the idea of a cross-linked polymer.

Most of the prior art publications describing polyacrylonitrile deal with polyacrylonitriles having average molecular weights in the range of 20,000 or higher. These materials do not perform as thermoplastic materials.

We have found that polycrylonitriles in the molecular weight range below about 14,000, when prepared by the process of the present invention, are true thermoplastic polymers which can be melted with heat and formed into solid, shaped articles while in the molten or liquid state.

Polyacrylonitriles having molecular weights below about 14,000 are known in the prior art. U.S. Patents Nos. 2,763,636 and 3,208,962, for instance, describe polyacrylonitriles in this molecular weight range.

The polymerization of acrylonitrile in aqueous solution is described in U.S. Patent No. 2,628,223. This reference deals with the preparation of polyacrylonitriles which have controlled molecular weights for fiber use. The polymers of U.S. Patent 2,628,223 are described as having average molecular weights of at least 50,000 and they are prepared by polymerizing acrylonitrile in an aqueous solution which has a pH between 2.5 and 3.5. This reference also discloses that at a pH in the range of 4–6, polyacrylonitriles of much higher molecular weights are produced. The low molecular weight, thermoplastic polyacrylonitriles produced by the process of the present invention cannot be prepared by the process of U.S. Patent No. 2,628,223.

I have discovered that thermoplastic polyacrylonitriles having molecular weights in the range of from about 3,000 to 10,000 can be prepared by polymerizing acrylonitrile in aqueous solution which is substantially free of inorganic salts except for polymerization initiator, which solution is maintained in the pH range of from about 4.5 to 8.0. The polymerization process of the present invention is preferably carried out in the substantial absence of molecular oxygen and in the presence of a water-soluble, free radical polymerization initiator at a temperature dependent on the activity of the initator in the range of from 0 to 70° C.

The process of the present invention produces thermoplastic polyacrylonitriles which are readily extruded, milled, molded and otherwise processed as thermoplastic materials by conventional means. The process of this invention can be conducted in a batch or continuous manner.

The polyacrylonitriles prepared by the process of this invention are useful as coatings, adhesives, and in the production of shaped articles such as bottles, pipes, sheets, and the like.

It has been found that the molecular weight of polyacrylonitrile prepared by my process is determined to some extent by the concentration of the acrylonitrile in the aqueous solution. Generally, the more dilute the aqueous solution is in respect to acrylonitrile, the lower the molecular weight of the resulting polyacrylonitrile will be. Aqueous solutions containing only as the primary reactant components a polymerization initiator and from about 0.01 to 0.10 mole of acrylonitrile per liter, when polymerized under the conditions of the process of this invention, will produce thermoplastic polyacrylonitriles.

Polymerization initiators useful in this invention include peroxy compounds such as hydrogen peroxide, benzyl peroxide, acetyl peroxide, peracetic acid, cumene hydroperoxide, t-butyl hydroperoxide; azo compounds such as azobisisobutyronitrile; sodium, potassium or ammonium persulfate; the so-called redox catalysts; X-rays; ultraviolet rays; nuclear radiation and the like.

In the preferred process of this invention the aqueous solution of acrylonitrile containing 0.0001 to 0.01 mole per liter of polymerization initiator is heated in an inert atmosphere to temperatures ranging from about 20° C. to 70° C. and preferably between 35° C. and 65° C. The polymerization may be carried out by adding all of the monomer to the polymerization reaction mixture at once or in increments or in a continuous manner during the course of the polymerization reaction.

The polymeric product of the process of this invention can be isolated by spray drying, filtration or centrifugation of the polymer water slurry.

The following examples will further illustrate this invention. The molecular weights of the polymers described in the following examples were determined by the standard procedure of solution viscosity in dimethyl formamide at 25° C. using Equation No. 13 described by W. R. Kriegbaum and A. M. Kotliar in Journal of Polymer Science, 32, 323 (1958).

EXAMPLE I

A polymer was prepared by polymerization at 60° C. in an inert atmosphere of a solution of 100 parts by weight of distilled acrylonitrile in 31,000 parts by weight of water containing 2.9 parts by weight of potassium persulfate and 5.8 parts by weight of ammonium persulfate. The polymerization mixture was found to have a pH of 4.5. At the end of about 48 hours the reaction was stopped and the mixture was treated with a small amount of water saturated with aluminum sulfate as a filtration aid. The polyacrylonitrile solid precipitate was isolated by filtration. 16.9 parts of dry polyacrylonitrile (16.9% of theory) having an intrinsic viscosity of 0.114 deciliter per gram or a weight average molecular weight of 3,900 were obtained. The polymer was found to soften at 195° C. and melt at 205° C.

EXAMPLE II

A solution of 100 parts of distilled acrylonitrile in 28,200 parts of water was stirred in a nitrogen atmosphere at 60° C. To this stirred solution were added 2.82 parts of potassium persulfate and 5.64 parts of ammonium persulfate. The polymerization mixture was found to have a pH of 4.5. Polymer precipitation was observed in about 80 minutes after the persulfate addition was completed. The reaction was stopped after seven hours, and 13.5 parts of dry polymer which corresponds to a 13.5% yield were obtained. This polymer had an intrinsic viscosity of 0.240 deciliter per gram at 25° C. in dimethyl formamide, which corresponds to a weight average molecular weight of 9,700. The solid polymer powder was light yellow in color and found to soften and become plastic in nature when heated slowly to 235° C. The polymer was found to flow readily when heated rapidly to 235° C.

EXAMPLE III

A polyacrylonitrile was prepared by the procedure of Example I with the exception that twice the amount of persulfate was used. The polyacrylonitrile was isolated in 22.75% yield and was found to have a molecular weight of 4,500. This light yellow, powdery polyacrylonitrile softened at 115° C. and became fluid at 150° C.

EXAMPLE IV

A solution of 100 parts of distilled acrylonitrile, 15,700 parts of distilled water, 1.575 parts of potassium persulfate and 3.150 parts of ammonium persulfate was stirred at 60° C. under a nitrogen atmosphere for 6 hours. 22.1 parts of polyacrylonitrile having a molecular weight of 16,200 were isolated by filtration of the polymerization suspension. The polyacrylonitrile softened at 150° C. but did not flow at even higher temperatures.

EXAMPLE V

A polyacrylonitrile outside the scope of this invention was prepared by stirring at 60° C. under a nitrogen atmosphere a mixture of 900 parts by weight of distilled water that had been saturated with acrylonitrile at 60° C., 5 parts by weight of concentrated hydrochloric acid, 111 parts by weight of distilled acrylonitrile and 0.5 part by weight of azobisisobutyronitrile. The reaction mixture was found to have a pH of about 1–1.5. The reaction was stopped in about six hours and the polymer was isolated by filtration. A 32.5% yield of polyacrylonitrile having a molecular weight of 176,000 was obtained in this manner. This polymer could not be softened by heating to 250° C. and above.

EXAMPLE VI

A mixture of 100 parts by weight of acrylonitrile, 15,750 parts by weight of water, 1.575 parts by weight of potassium persulfate and 3.150 parts by weight of ammonium persulfate was reacted under a nitrogen atmosphere at 60° C. with stirring for seven hours. A white polymer was obtained (27.75 parts by weight) which had an intrinsic viscosity of 0.4894 deciliter per gram which corresponds to a molecular weight of 23,670. This polymer did not melt but appeared to soften at 230° C.

EXAMPLE VII

The procedure set forth in U.S. Patent No. 3,208,962 was repeated as follows:

(A) A polymerization reaction was carried out at 60° C. under a nitrogen atmosphere for seven hours employing the following recipe:

| | Parts |
|---|---|
| $H_2O_2$ | 15 |
| 60% aqueous $ZnCl_2$ | 900 |
| Acrylonitrile | 100 |
| $H_3PO_4$ | 12.5 |

When the resulting solution was added dropwise to 25,000 parts of rapidly stirred distilled water, no polymer formed.

(B) A repeat of (A) using a reaction time of 280 minutes yielded a very small amount of polymer which did not melt or soften when heated to 250° C.

EXAMPLE VIII

Example 3 of U.S. Patent No. 2,763,636 was repeated as follows:

(A) A polymerization reaction was carried out at 50° C. under a nitrogen atmosphere for seven hours employing the following recipe:

| | Parts by weight |
|---|---|
| Acrylonitrile | 100 |
| $H_2O$ | 286 |
| $MgCl_2 \cdot 6H_2O$ | 400 |
| $ZnCl_2$ | 560 |
| $CuCl_2 \cdot H_2O$ | 0.00702 |
| $K_2S_2O_8$ | 1.0 |

Upon completion of the reaction the polymer was precipitated by the dropwise addition of the reaction solution to 8000 parts of rapidly stirred distilled water. The precipitated polymer was isolated by filtration. This polymer was found to be only partially soluble in dimethyl formamide, the soluble portion causing a deep purple color to develop. This polymer was found to soften at 120° C. but remained opaque. The yield of polymer was 29.4 parts. The infrared spectrum for this polymer differs markedly from the usual polyacrylonitrile spectra in that a band appeared at 1620 cm.$^{-1}$ which is probably due to a cyano group or metal complex.

(B) (A) above was repeated using the following recipe:

| | Parts by weight |
|---|---|
| Acrylonitrile | 100 |
| $H_2O$ | 605 |
| $ZnCl_2$ | 1262 |
| $MgCl_2 \cdot 6H_2O$ | 842 |
| $K_2S_2O_8$ | 1 |
| $CuCl_2 \cdot H_2O$ | 0.071 |

After the reaction period the solution was added to a large volume of distilled water and the precipitate was collected by filtration. A yield of 11.3 parts of polymer was obtained. The polymer did not melt and was found to have a molecular weight of 5,180. Only 49% of the polymer was found to be soluble in dimethyl formamide.

I claim:

1. A process for preparing thermoplastic polyacrylonitrile resins comprising polymerizing acrylonitrile in an aqueous solution consisting essentially of acrylonitrile monomer and a free radical polymerization initiator wherein the concentration of the acrylonitrile monomer ranges from about 0.01 to 0.10 mole per liter of solution and the pH of the solution is in excess of 4, and recovering the polymeric product therefrom.

2. The process of claim 1 carried out in the substantial absence of molecular oxygen.

3. The process of claim 2 carried out at a temperature in the range of from 0° C. to 70° C.

4. The process of claim 3 wherein the aqueous solution contains from 0.0001 to 0.01 mole per liter of a polymerization initiator.

5. The process of claim 4 carried out in the temperature range between 35° C. and 65° C.

References Cited

UNITED STATES PATENTS

| | | | |
|---|---|---|---|
| 3,022,281 | 2/1962 | Smith | 260—88.7 |
| 3,280,086 | 10/1966 | Nakajima et al. | 260—88.7 |
| 3,058,937 | 10/1962 | Furness | 260—88.7 |
| 3,375,237 | 3/1968 | Baizer | 260—88.7 |

HARRY WONG, Jr., Primary Examiner

U.S. Cl. X.R.

204—159.22; 260—32.6